(12) United States Patent
Park et al.

(10) Patent No.: US 12,078,709 B2
(45) Date of Patent: Sep. 3, 2024

(54) POWER CONTROL SCHEME FOR RADIO FREQUENCY OBJECT DETECTION

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Franklin Park, NJ (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/222,726

(22) Filed: Apr. 5, 2021

(65) Prior Publication Data
US 2021/0389444 A1 Dec. 16, 2021

Related U.S. Application Data

(60) Provisional application No. 63/037,939, filed on Jun. 11, 2020.

(51) Int. Cl.
G01S 13/04 (2006.01)
H04W 52/24 (2009.01)
H04W 52/36 (2009.01)

(52) U.S. Cl.
CPC ........... *G01S 13/04* (2013.01); *H04W 52/242* (2013.01); *H04W 52/362* (2013.01); *H04W 52/367* (2013.01)

(58) Field of Classification Search
None
See application file for complete search history.

(56) References Cited

U.S. PATENT DOCUMENTS

2014/0220905 A1   8/2014   Buckley et al.
2018/0287651 A1   10/2018  Fernando et al.
2019/0327694 A1   10/2019  Zur

OTHER PUBLICATIONS

CATT:"Physical-Layer Procedures to Support UE/gNB Measurements",3GPP Draft,3GPP TSG RAN WG1 Mtg #97, R1-1906308 NR POS-Procedures,3rd Generation Partnership Project(3GPP),Mobile Competence Centre,650, Route Des Lucioles,F-06921 Sophia-Antipolis Cedex,FR, vol. RAN WG1,No. Reno,USA,May 13, 2019-May 17, 2019,May 13, 2019 (May 13, 2019),XP051727758,9 Pgs,Retrieved from the Internet:URL:http://www.3gpp.org/ftp/Mtgs%5F3GPP%5FSYNC/RAN1/Docs/R1%2D1906308%2Ezip retrieved May 13, 2019]Section 1,p. 2,Section 4,p. 8(Proposal 11),para [03.1].
International Search Report and Written Opinion—PCT/US2021/025910—ISA/EPO—Jul. 14, 2021.

*Primary Examiner* — Whitney Moore
(74) *Attorney, Agent, or Firm* — QUALCOMM Incorporated

(57) ABSTRACT

In an aspect, a wireless node (e.g., BS or UE) transmits a first set of RF signals for communication in accordance with a first power control scheme, and transmits a second set of RF signals at least for object detection in accordance with a second power control scheme.

30 Claims, 10 Drawing Sheets

POWER CONTROL SCHEME FOR RADIO FREQUENCY OBJECT DETECTION

CROSS-REFERENCE TO RELATED APPLICATION

The present application for patent claims the benefit of U.S. Provisional Application No. 63/037,939, entitled "POWER CONTROL SCHEME FOR RADIO FREQUENCY OBJECT DETECTION", filed Jun. 11, 2020, assigned to the assignee hereof and hereby expressly incorporated by reference herein in its entirety.

BACKGROUND OF THE DISCLOSURE

1. Field of the Disclosure

Aspects of this disclosure relate generally to environment sensing and the like.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipments (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless node includes transmitting a first set of radio frequency (RF) signals for communication in accordance with a first power control scheme; and transmitting a second set of RF signals at least for object detection in accordance with a second power control scheme.

In some aspects, the second set of RF signals is configured for both communication and object detection.

In some aspects, the second power control scheme is based on a pathloss between a user equipment (UE) and a serving cell.

In some aspects, the second power control scheme sets a transmission power to a fixed value.

In some aspects, the second power control scheme comprises a transmission power ramping scheme.

In some aspects, the transmission power ramping scheme starts transmission of one or more RF signals at a minimum transmission power level and increases transmission power in accordance with a given step size until one or more target objects are detected or a maximum transmission power level is reached.

In some aspects, the method includes selecting the second power control scheme from among a plurality of power control schemes based on at least one target object measurement objective.

In some aspects, the at least one target object measurement objective comprises: detecting target objects across a widest target detection area, or detecting one or more target objects proximate to a user equipment (UE) or a serving cell of the UE, or detecting at least one target object using a lowest amount of transmission power, or any combination thereof.

In an aspect, a wireless node includes a memory; a communication interface; and at least one processor communicatively coupled to the memory and the communication interface, the at least one processor configured to: cause the communication interface to transmit a first set of radio frequency (RF) signals for communication in accordance with a first power control scheme; and cause the communication interface to transmit a second set of RF signals at least for object detection in accordance with a second power control scheme.

In some aspects, the second set of RF signals is configured for both communication and object detection.

In some aspects, the second power control scheme is based on a pathloss between a user equipment (UE) and a serving cell.

In some aspects, the second power control scheme sets a transmission power to a fixed value.

In some aspects, the second power control scheme comprises a transmission power ramping scheme.

In some aspects, the transmission power ramping scheme starts transmission of one or more RF signals at a minimum transmission power level and increases transmission power in accordance with a given step size until one or more target objects are detected or a maximum transmission power level is reached.

In some aspects, the at least one processor is further configured to: select the second power control scheme from among a plurality of power control schemes based on at least one target object measurement objective.

In some aspects, the at least one target object measurement objective comprises: detect target objects across a widest target detection area, or detect one or more target objects proximate to a user equipment (UE) or a serving cell of the UE, or detecting at least one target object using a lowest amount of transmission power, or any combination thereof.

In an aspect, a wireless node includes means for transmitting a first set of radio frequency (RF) signals for communication in accordance with a first power control scheme; and means for transmitting a second set of RF signals at least for object detection in accordance with a second power control scheme.

In some aspects, the second set of RF signals is configured for both communication and object detection.

In some aspects, the second power control scheme is based on a pathloss between a user equipment (UE) and a serving cell.

In some aspects, the second power control scheme sets a transmission power to a fixed value.

In some aspects, the second power control scheme comprises a transmission power ramping scheme.

In some aspects, the transmission power ramping scheme starts transmission of one or more RF signals at a minimum transmission power level and increases transmission power in accordance with a given step size until one or more target objects are detected or a maximum transmission power level is reached.

In some aspects, the method includes means for selecting the second power control scheme from among a plurality of power control schemes based on at least one target object measurement objective.

In some aspects, the at least one target object measurement objective comprises: means for detecting target objects across a widest target detection area, or means for detecting one or more target objects proximate to a user equipment (UE) or a serving cell of the UE, or detecting at least one target object using a lowest amount of transmission power, or any combination thereof.

In an aspect, a non-transitory computer-readable medium storing computer-executable instructions that, when executed by a wireless node, cause the wireless node to: transmit a first set of radio frequency (RF) signals for communication in accordance with a first power control scheme; and transmit a second set of RF signals at least for object detection in accordance with a second power control scheme.

In some aspects, the second set of RF signals is configured for both communication and object detection.

In some aspects, the second power control scheme is based on a pathloss between a user equipment (UE) and a serving cell.

In some aspects, the second power control scheme sets a transmission power to a fixed value.

In some aspects, the second power control scheme comprises a transmission power ramping scheme.

In some aspects, the transmission power ramping scheme starts transmission of one or more RF signals at a minimum transmission power level and increases transmission power in accordance with a given step size until one or more target objects are detected or a maximum transmission power level is reached.

In some aspects, the one or more instructions further cause the wireless node to: select the second power control scheme from among a plurality of power control schemes based on at least one target object measurement objective.

In some aspects, the at least one target object measurement objective comprises: detect target objects across a widest target detection area, or detect one or more target objects proximate to a user equipment (UE) or a serving cell of the UE, or detecting at least one target object using a lowest amount of transmission power, or any combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
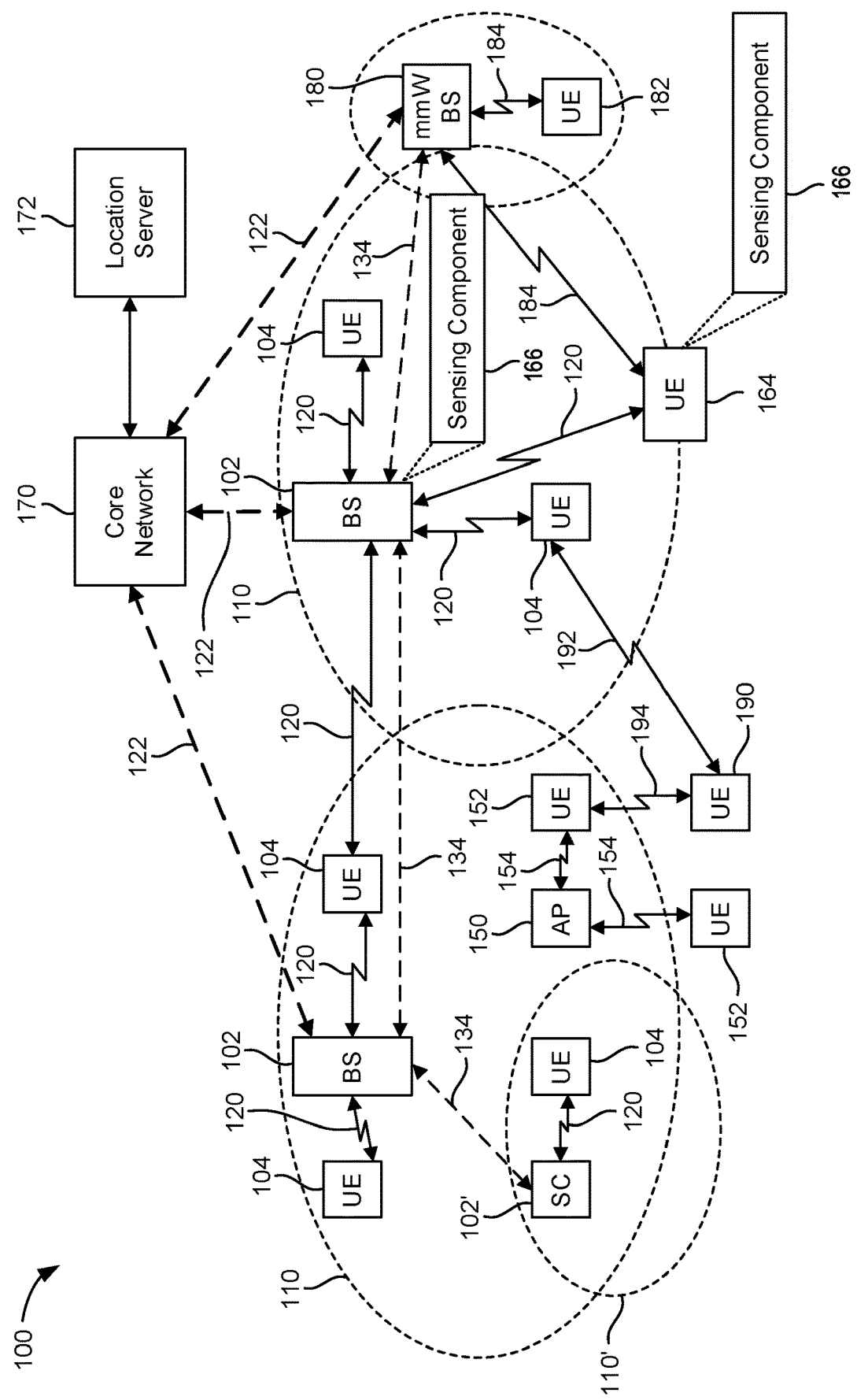
FIG. 1 illustrates an exemplary wireless communications system, according to various aspects of the disclosure.

Disclosed are techniques for object detection based on radio frequency (RF) signals from a user equipment. In an aspect, the UE may transmit a first set of RF signals for communication in accordance with a first power control scheme, and a second set of RF signals at least for object detection (e.g., in some designs, for both object detection and communication) in accordance with a second power control scheme.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "radar signal," a "radio wave," a "waveform," or the like, or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies in communication with a UE 182. The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz), which is identified by the International Telecommunications Union (ITU) as a "millimeter wave" band.

With the above aspects in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, or may be within the EHF band.

Communications using the mmW radio frequency band have high path loss and a relatively short range. The mmW base station 180 and the UE 182 may therefore utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

5G supports multi-carrier operation, such as carrier aggregation. In a multi-carrier system, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a sensing component 166 that may enable the UE 164 to perform the UE environment sensing operations described herein. Similarly, the base stations 102 may include a sensing component 166 that may enable the base stations 102 to perform the base station environment sensing operations described herein. Note that although only UE 164 and one base station 102 in FIG. 1 are illustrated as including a sensing component 166, any of the UEs and base stations in FIG. 1 may include a sensing component 166.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

5G uses RF signals at mmW frequencies for wireless communication between network nodes, such as base stations, UEs, vehicles, factory automation machinery, and the like. However, mmW RF signals can be used for other purposes as well, such as weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

In addition, mmW RF signals can be used for environmental sensing, such as object detection and motion sensing.

RF signals at mmW frequencies can provide high bandwidth and a large aperture to extract accurate range, Doppler, and angle information for environment sensing. Using mmW RF signals for environment sensing can provide such features in a compact form factor, such as a small sensing component that can conveniently fit into a handheld device. Such a sensing component (e.g., a chip) may be a digital signal processor (DSP), a system-on-chip (SoC), or other processing component that can be integrated into another device (a host device), such as a UE, a base station, an IoT device, a factory automation machine, or the like. In an aspect, a sensing component may be, or may be incorporated into, a modem for wireless communication, such as a 5G modem, a 60 GHz WLAN modem, or the like. A device containing a sensing component may be referred to as a host device, an environment sensing device, a sensing device, and the like.

Figure 2A:
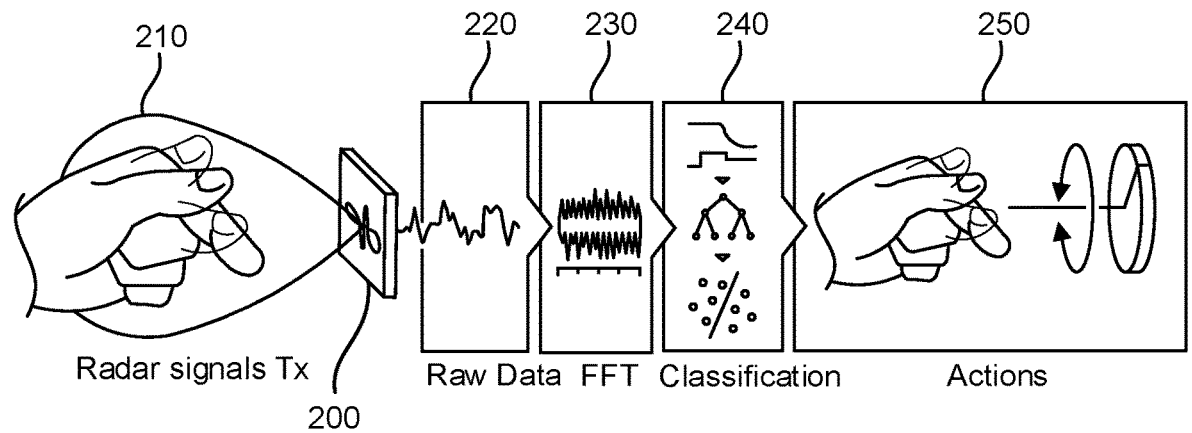
FIG. 2A illustrates the general process of transmitting and collecting mmW RF signal data, according to aspects of the disclosure.

FIG. 2A illustrates the general process of transmitting and collecting mmW RF signal data, according to aspects of the disclosure. In the example of FIG. 2A, at stage 210, a sensing component 200 (which may correspond to sensing component 100 in FIG. 1) transmits mmW RF signals with a predefined waveform, such as a frequency modulated continuous wave (FMCW). In FMCW techniques, an RF signal with a known stable frequency continuous wave (i.e., an RF signal with constant amplitude and frequency) varies up and down in frequency over a fixed period of time according to a modulating signal. The mmW RF signals may be transmitted in a beam (e.g., using beamforming) and may reflect off of nearby objects, such as a human face or hand, within the beam. A portion of the transmitted RF signals is reflected back towards the sensing component 200. At stage 220, the sensing component 200 receives/detects the RF return data (i.e., the reflections of the transmitted mmW RF signals).

At stage 230, the sensing component 200 performs a fast Fourier transform (FFT) on the raw RF return data. An FFT converts an RF signal from its original domain (here, time) to a representation in the frequency domain, and vice versa. Frequency differences between the received RF signal and the transmitted RF signal increase with delay (i.e., the time between transmission and reception), and hence, with distance (range). The sensing component 200 correlates reflected RF signals with transmitted RF signals to obtain range, Doppler, and angle information associated with the target object. The range is the distance to the object, the Doppler is the speed of the object, and the angle is the horizontal and/or vertical distance between the detected object and a reference RF ray emitted by the sensing component 200, such as the initial RF ray of a beam sweep.

From the determined properties of the reflected RF signals, the sensing component 200 can determine information about the detected object's characteristics and behaviors, including the size, shape, orientation, material, distance, and velocity of the object. At stage 240, the sensing component 200 classifies the detected object and/or motion of the detected object based on the determined characteristics. For example, the sensing component 200 can use machine learning to classify the detected object as a hand and the motion of the detected object as a twisting motion. At stage 250, based on the classification at stage 240, the sensing component 200 can cause the host device to perform an action, such as turning a virtual dial on the screen of the host device as in the example of FIG. 2.

Figure 2B:
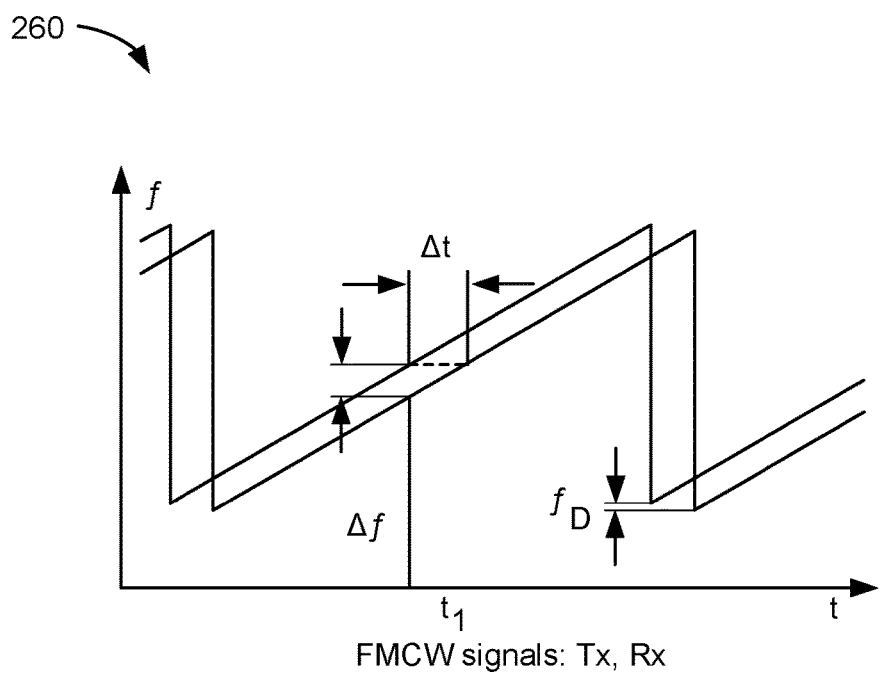
FIG. 2B is a graph illustrating an exemplary waveform of transmitted and received frequency modulated continuous wave (FMCW) RF signals, according to aspects of the disclosure.

FIG. 2B is a graph 260 illustrating an exemplary waveform of a transmitted and received FMCW RF signals, according to aspects of the disclosure. FIG. 2B illustrates an example of a sawtooth modulation, which is a common FMCW waveform where range is desired. Range information is mixed with the Doppler velocity using this technique. Modulation can be turned off on alternate scans to identify velocity using unmodulated carrier frequency shift. This allows range and velocity to be determined with one radar set.

As shown in FIG. 2B, the received RF waveform (the lower diagonal lines) is simply a delayed replica of the transmitted RF waveform (the upper diagonal lines). The frequency at which the waveforms are transmitted is used to down-convert the received RF waveform to baseband (a signal that has a near-zero frequency range), and the amount of frequency shift between the transmitted RF waveform and the reflected (received) RF waveform increases with the time delay between them. The time delay is thus a measure of range to the target object. For example, a small frequency spread is produced by reflections from a nearby object, whereas a larger frequency spread is produced by reflections from a further object, thereby resulting in a longer time delay between the transmitted and received RF waveforms.

Figure 3:
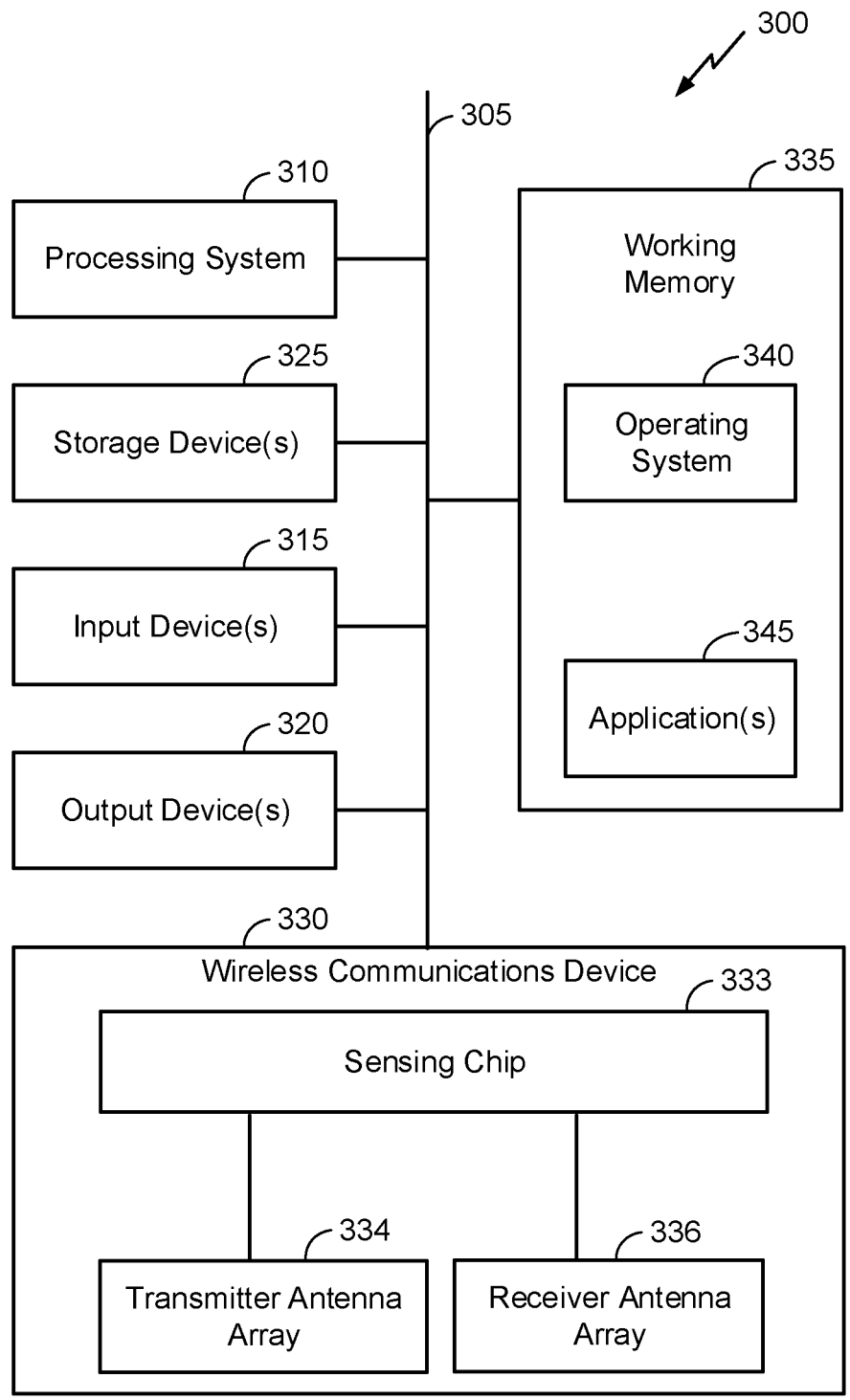
FIG. 3 illustrates an exemplary electronic device configured as an environment sensing device, according to aspects of the disclosure

FIG. 3 illustrates an exemplary electronic device 300 configured as an environment sensing device, according to aspects of the disclosure, which may incorporate a sensing component as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner. In addition, it can be noted that components illustrated by FIG. 3 can be localized to a single device and/or distributed among various networked devices, which may be disposed at different physical or geographical locations. The electronic device 300 may be, or be incorporated into, any of a variety of devices, including a WLAN AP (e.g., WLAN AP 150 in FIG. 1), a cellular base station (e.g., base station 102, small cell base station 102', mmW base station 180 in FIG. 1), or a UE, such as a "smart" speaker (e.g., an Amazon Echo, Google Home, Apple HomePod, etc.) or other IoT device, a mobile phone, tablet computer, a personal computer (PC), a laptop computer, a security device (e.g., camera, floodlight, etc.), a factory automation machine, and/or the like.

The electronic device 300 is shown comprising hardware elements that can be electrically (communicatively) coupled via a bus 305 (or may otherwise be in communication, as appropriate). The hardware elements may include a processing system 310, which can include without limitation one or more general-purpose processors, one or more special-purpose processors (such as a DSP, ASIC, field programmable gate array (FPGA), and/or the like), one or more processing cores, and/or other processing structures, which can be configured to perform the functionality described herein. The electronic device 300 also can include one or more input devices 315, which can include without limitation a touchscreen, a mouse, a keyboard, a camera, a microphone, and/or the like; and one or more output devices 320, which can include without limitation a display device (e.g., a touchscreen, one or more light-emitting diodes (LEDs), a printer, and/or the like.

The electronic device 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 300 may also include a wireless communications device 330 that can include support for one or more wireless communication technologies (e.g., 5G, IEEE 802.11ad). The wireless communications device 330 may comprise a modem, a transceiver, a transmit/receive processor, and/or the like, corresponding to or including a sensing component 333, such as the sensing component 100 in FIG. 1 or the sensing component 200 in FIG. 2A. The wireless communications device 330 may include one or more input and/or output communication interfaces to permit data and signaling to be exchanged with a wireless network (e.g., a 5G network) or other wireless devices within the wireless network. In an aspect, the sensing component 333 may include or be coupled to a transmitter antenna array 334 and a receiver antenna array 336, and the circuitry connected with the antenna elements 334 and 336 may be used for both the environment sensing techniques described herein and wireless data communication. For example, in some aspects, the wireless communications device 330 may comprise a 5G modem capable of both the environment sensing techniques described herein and wireless data communication.

The wireless communications device 330 may comprise an integrated communications device (e.g., embodied as a transmitter circuit and a receiver circuit of a single communication device) in some implementations, and in others, may comprise a separate transmitter device and a separate receiver device, or may be embodied in other ways in other implementations. In an aspect, a transmitter may include a plurality of antennas, such as transmitter antenna array 334, that permits the electronic device 300 to perform transmit "beamforming," as described further herein. Similarly, a receiver may include a plurality of antennas, such as receiver antenna array 336, that permits the electronic device 300 to perform receive beamforming, as described herein.

The electronic device 300 may further comprise a working memory 335, which can include a RAM and/or or ROM device. Software elements, shown as being located within the working memory 335, can include an operating system 340, device drivers, executable libraries, and/or other code, such as application(s) 345, which may comprise computer programs provided by various aspects, and/or may be designed to implement methods, and/or configure systems, provided by other aspects, as described herein. Merely by way of example, one or more procedures described with respect to the method(s) discussed below may be implemented as code and/or instructions that are stored (e.g., temporarily) in working memory 335 and are executable by a computer (and/or a processing unit within a computer, such as processing system 310); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 325 described above. In some cases, the storage medium might be incorporated within a computer system, such as electronic device 300. In other aspects, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 300 and/or might take the form of source and/or installable code, which, upon compilation and/or installation on the electronic device 300 (e.g., using any of a variety of generally available compilers, installation programs, compression/decompression utilities, etc.), then takes the form of executable code.

Figure 4:
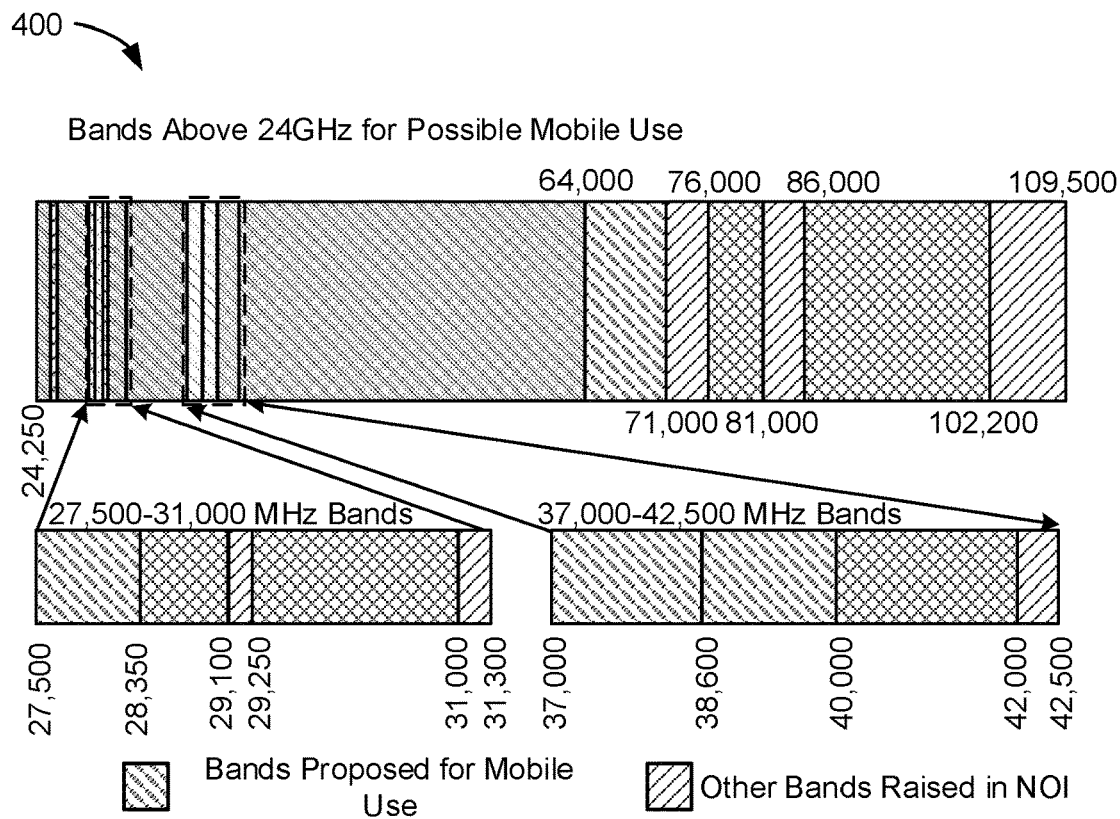
FIG. 4 is a diagram of various frequency bands above 24 GHz that may be used for wireless mobile communications.

Spectrum in the 30 GHz to 300 GHz frequency bands has been used in 5G NR and 802.11ad networks (e.g., 60 GHz communication networks) for wireless data communication. Larger bandwidth (e.g., greater than or equal to 2 GHz) can enable data rates of multigigabits per second. FIG. 4 is a diagram 400 of various frequency bands above 24 GHz that may be used for wireless mobile communications. Of particular interest for NR 5G operation are the frequency bands from 27,500 MHz to 31,000 MHz and 37,000 MHz to 42,500 MHz.

Figure 5:
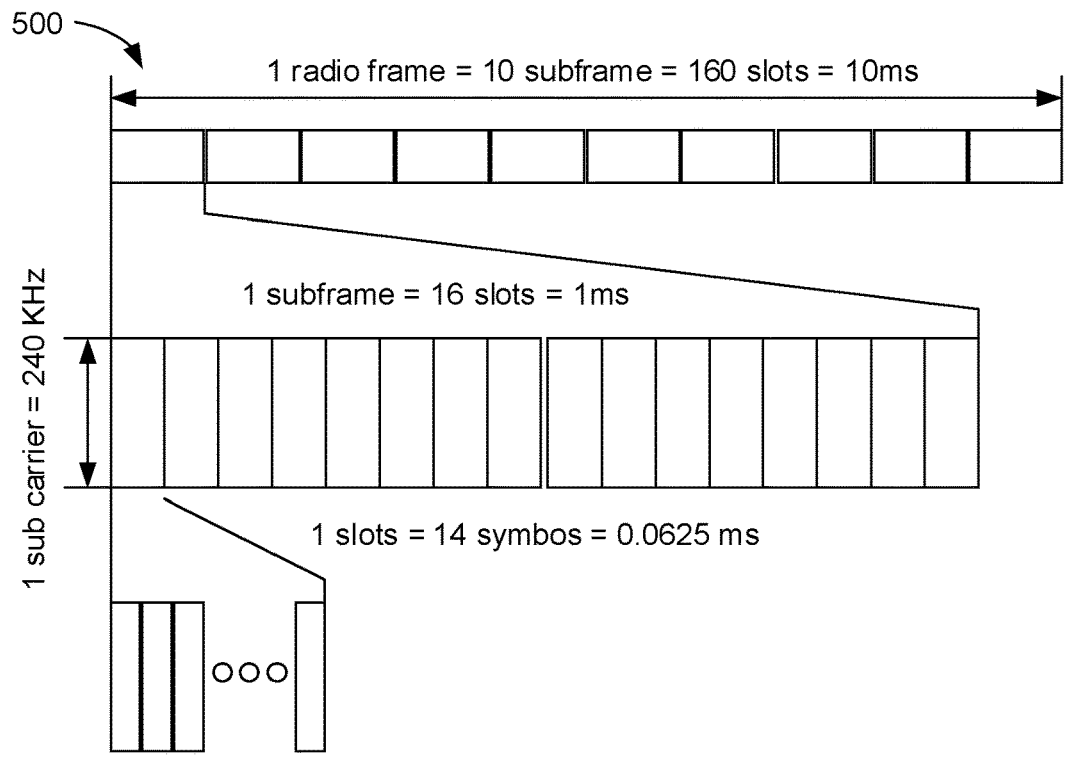
FIG. 5 is a diagram illustrating an example of a radio frame structure, according to aspects of the disclosure.

Various frame structures may be used to support downlink and uplink transmissions between network nodes (e.g., base stations and UEs). FIG. 5 is a diagram 500 illustrating an example of a radio frame structure, according to aspects of the disclosure. Other wireless communications technologies may have different frame structures and/or different channels.

5G NR utilizes orthogonal frequency division multiplexing (OFDM) on the downlink and single-carrier frequency division multiplexing (SC-FDM) or OFDM on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, 5G NR may support multiple numerologies (μ), for example, subcarrier spacing (SCS) of 15 kHz, 30 kHz, 60 kHz, 120 kHz, and 240 kHz or greater may be available. Table 1 provided below lists some various parameters for different NR numerologies. As shown in Table 2, the slot length becomes shorter as the SCS becomes wider. For example, for 240 kHz SCS in 28 GHz, there are only 250 microseconds (μs) per slot, and the short slot reduces latency.

TABLE 1

| μ | SCS (kHz) | Symbols/Sot | Slots/Subframe | Slots/Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

FIG. 5 illustrates a frame structure for a numerology of 240 kHz. In FIG. 5, time is represented horizontally (e.g., on the X axis) with time increasing from left to right. In the time domain, a radio frame (e.g., 10 ms) is divided into 10 equally sized subframes of 1 millisecond (ms) each, and each subframe is divided into 16 time slots of 0.0625 ms each. Each slot is divided into 14 symbols of 4.17 μs each. One slot in the time domain and 12 contiguous subcarriers in the frequency domain is referred to as a resource block (RB). RBs are further divided into multiple resource elements (REs). An RE corresponds to one symbol length in the time domain and one subcarrier in the frequency domain.

Beamforming at mmW frequencies would be beneficial in a number of scenarios, including industrial IoT, AR/VR, autonomous driving, gaming, and the like. Each of these scenarios needs large data throughput, accurate beam alignment, fine granularity localization, and ultra-low latency. However, there are various issues that can arise. For example, beam alignment for mobility (i.e., UEs in motion) largely reduces the spectral efficiency and involves additional latency. As another example, for positioning purposes, there is still a gap between current capabilities and the desire to meet the centimeter-level granularity desired for industrial applications. Environmental sensing using 5G mmW RF signals can address these issues.

Figure 6:
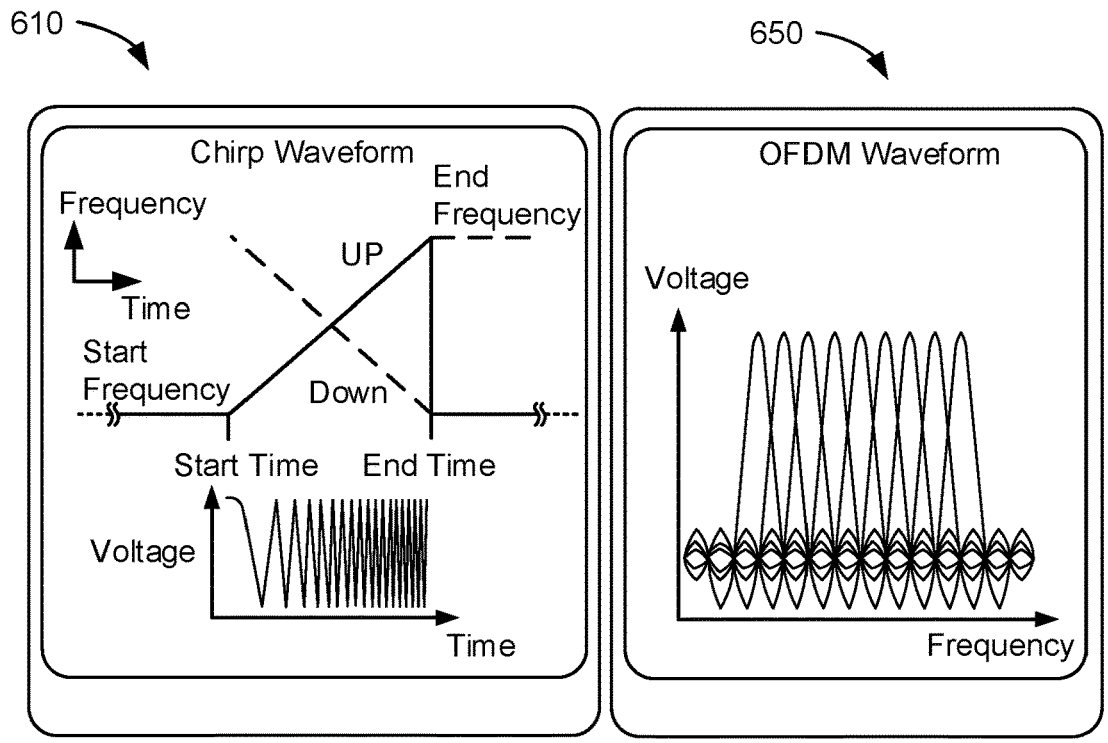
FIG. 6 illustrates a comparison between a simple chirp waveform and a mmW OFDM waveform, according to aspects of the disclosure.

For environment sensing in 5G mmW frequency bands, a wideband signal using multiple-input multiple-output (MIMO) would be desirable. MIMO is a technique for multiplying the capacity of a radio link using multiple transmission and receiving antennas to exploit multipath propagation. A simple chirp waveform could be used if the only purpose of the transmitted RF signal were for environmental sensing. However, due to the short wavelength, a more complex OFDM waveform in a 5G mmW frequency band can be used for both communication (e.g., over a 5G network) and environment sensing. FIG. 6 illustrates a comparison between a simple chirp waveform and a more complex mmW OFDM waveform, according to aspects of the disclosure. Specifically, FIG. 6 illustrates a diagram 610 of an exemplary chirp waveform and a diagram 650 of an exemplary mmW OFDM waveform.

Figure 7:
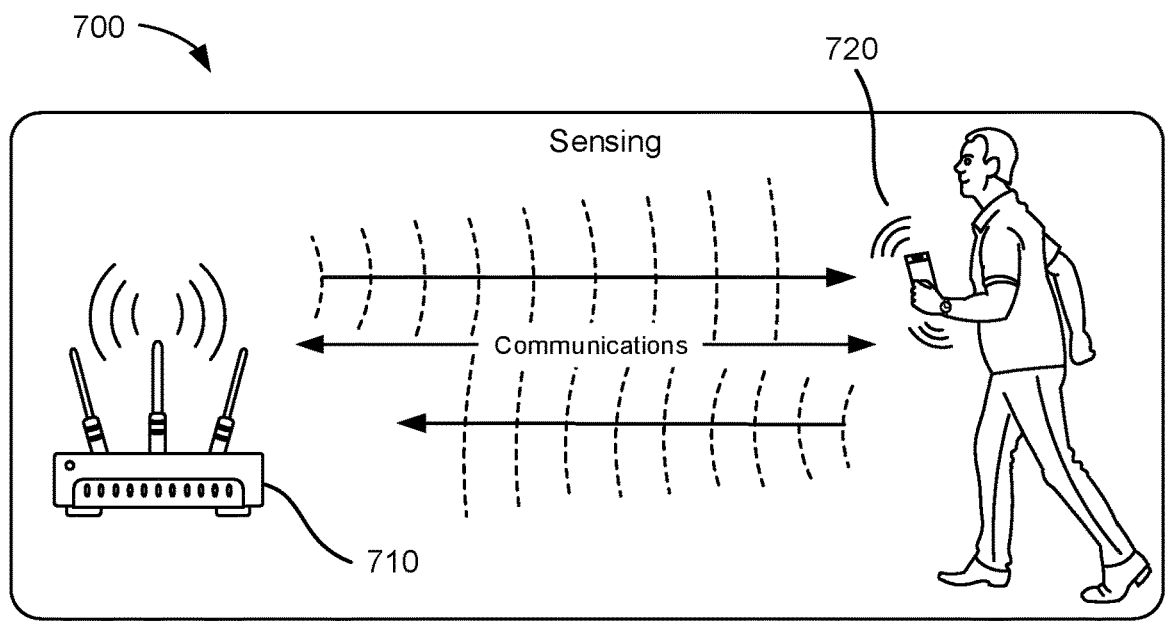
FIG. 7 is a diagram of an exemplary scenario in which a UE of a user is within communication range of an access point, according to aspects of the disclosure.

When using an OFDM waveform for environment sensing, both the downlink and uplink waveform can be used for sensing operations. FIG. 7 is a diagram 700 of an exemplary scenario in which a UE 720 of a user is within communication range of an AP 710 (or other type of base station), according to aspects of the disclosure. The AP 710 and the UE 720 may communicate over a wireless communication link configured in accordance with, for example, 5G NR or IEEE 802.11ad. In addition, in the downlink, the AP 710 can use environment sensing to detect the user's presence, motion, and actions for, for example, improved communication link establishment (e.g., what direction to form a transmit beam for the communication link). In the uplink, the UE 720 can use environment sensing to provide awareness of interactions with the user and/or the AP 710 (e.g., proximity) and/or to determine other personal information.

Benefits of using mmW RF signal-based environment sensing include non-vision-based low-power always-on context awareness, meaning the environment sensing device can sense objects and/or actions in any lighting conditions, and even when the object is blocked from view of the environment sensing device. Another benefit is touchless interaction, enabling a user to interact with an environment sensing device without touching a user interface (e.g., touchscreen, keyboard, etc.) of the sensing device. Applications of environment sensing include imaging the environment, such as creating a three-dimensional (3D) map of the environment for VR use cases, high resolution localization for, for example, industrial IoT use cases, assisting communication by, for example, providing more accurate beam tracking, and machine learning for, for example, providing an effective interface between the human user and the machine.

Figure 8:
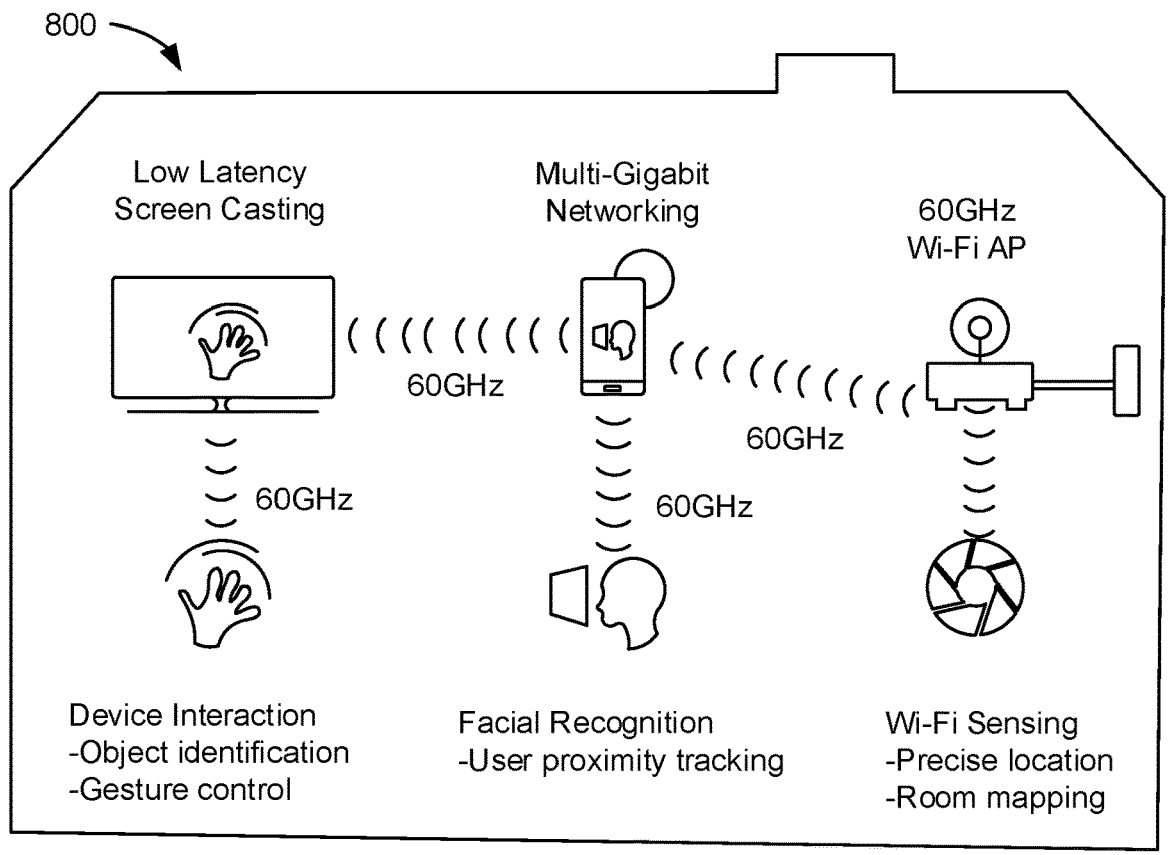
FIG. 8 is a diagram of various uplink and downlink environment sensing scenarios using 5G mmW RF signals, according to aspects of the disclosure.

FIG. 8 is a diagram 800 of various uplink and downlink environment sensing scenarios using 5G mmW RF signals, according to aspects of the disclosure. As an exemplary downlink-based sensing scenario, a Wi-Fi AP operating in accordance with 5G can configure downlink mmW RF signals for environment sensing and use them to perform imaging of the local environment to localize the users playing a VR game. At the same time, and potentially using the same downlink 5G mmW RF signals, the Wi-Fi AP can communicate with the UEs of the gamers for data transmission. As an exemplary uplink-based sensing scenario, a UE can transmit an uplink 5G mmW RF signal to communicate with the Wi-Fi AP, and at the same time, use the RF signal for facial or motion (e.g., hand motion) interaction with the user.

Figure 9:
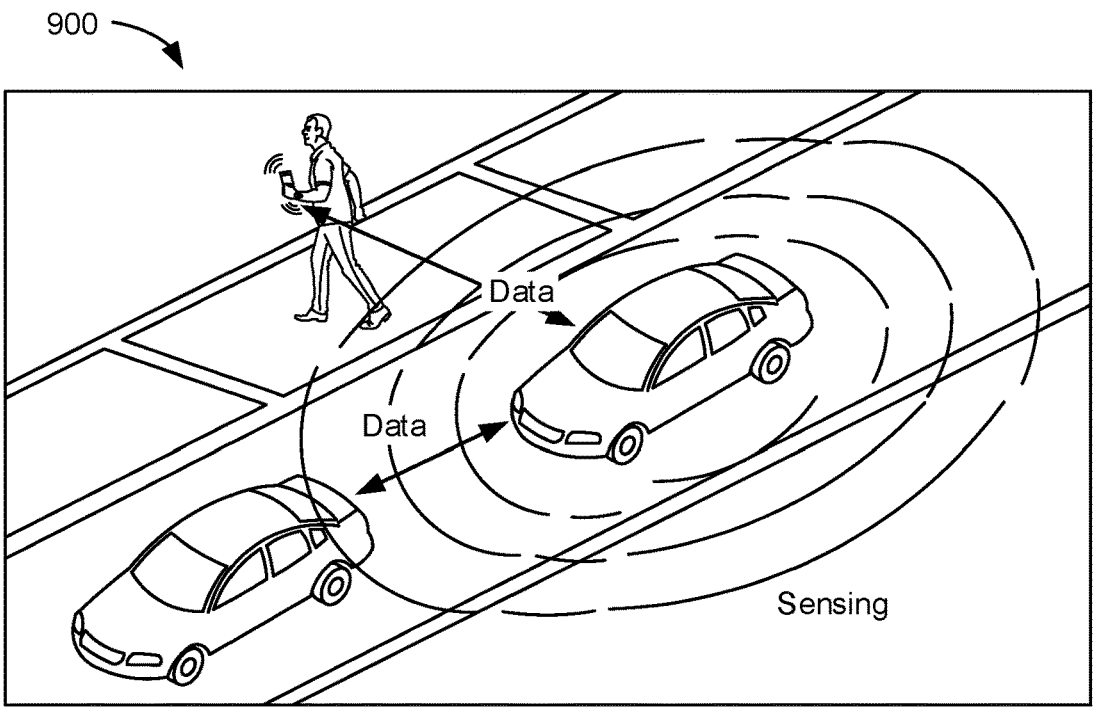
FIG. 9 is a diagram of a vehicle-to-vehicle (V2V)/vehicle-to-everything (V2X) environment sensing scenario using 5G mmW RF signals, according to aspects of the disclosure.

FIG. 9 is a diagram 900 of a vehicle-to-vehicle (V2V)/vehicle-to-everything (V2X) environment sensing scenario using 5G mmW RF signals, according to aspects of the disclosure. In the example of FIG. 9, multiple vehicles, referred to as "vehicle UEs" or "V-UEs," and a pedestrian UE (P-UE) may communicate with each other over sidelink communication links, which are a type of peer-to-peer (P2P)/device-to-device (D2D) communication link that operates in accordance with the 5G communications standard. In a sidelink sensing scenario, a V-UE and/or P-UE transmits 5G mmW RF signals to provide information to nearby UEs, and in addition, to measure the range to, and possibly relative location of, adjacent objects (e.g., other V-UEs, roadside access points, P-UEs, etc.).

As described above, RF signals for sensing (e.g., 5G mmW RF signals) can be characterized as consumer-level radar with advanced detection capabilities. RF signals for sensing may facilitate a touchless or device-free detection a target object (e.g., a target object that either does not have a communication device or such a communication device is not available). In some designs, 5G communications at mmW frequencies can be combined with environment sensing, thereby providing improved communication (e.g., by decreasing the amount of time needed for beam alignment) and additional dimensionality for radar applications. In order to use 5G mmW RF signals being used for communication for environment sensing (or object detection), the environment sensing device needs to determine how to combine the sensing waveform (i.e., the 5G mmW RF signals being used for environment sensing) with the NR OFDM waveform (i.e., the mmW RF signals being used to communicate in accordance with the 5G standard). The environment sensing device also needs to determine how to transmit the sensing waveform. Parameters affecting these determinations include the power control for the sensing waveform, the bandwidth configuration for the sensing waveform, the time duration configuration for the sensing waveform, and/or the antenna configuration for the sensing waveform.

Figure 10A:
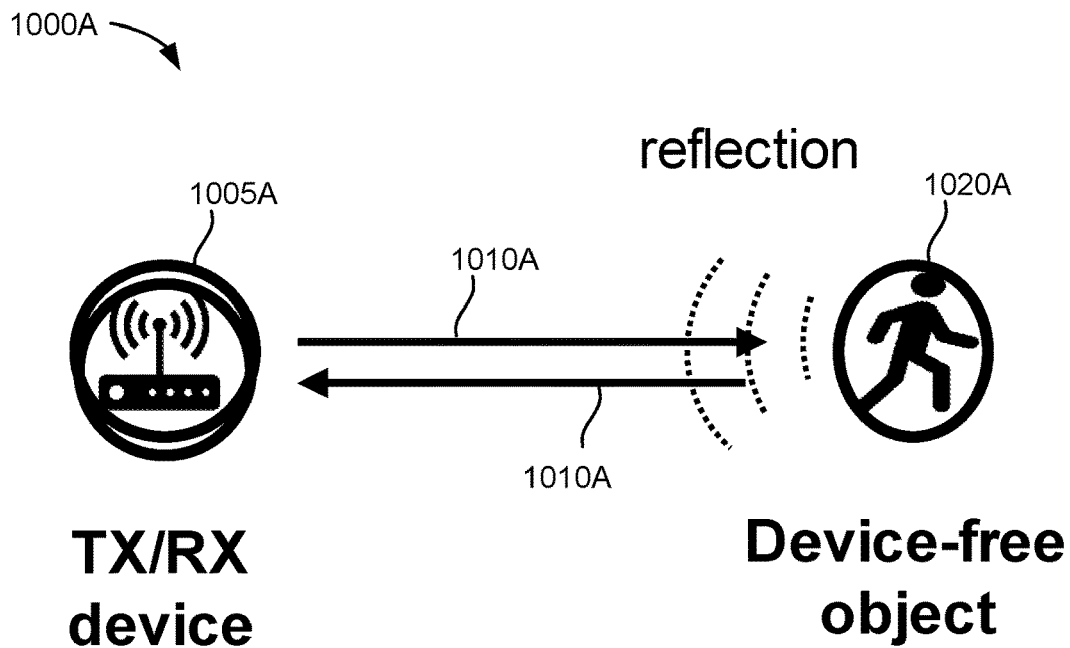
FIGS. 10A-10B illustrate RF signal-based object detection scenarios in accordance with aspects of the disclosure.
Figure 10B:
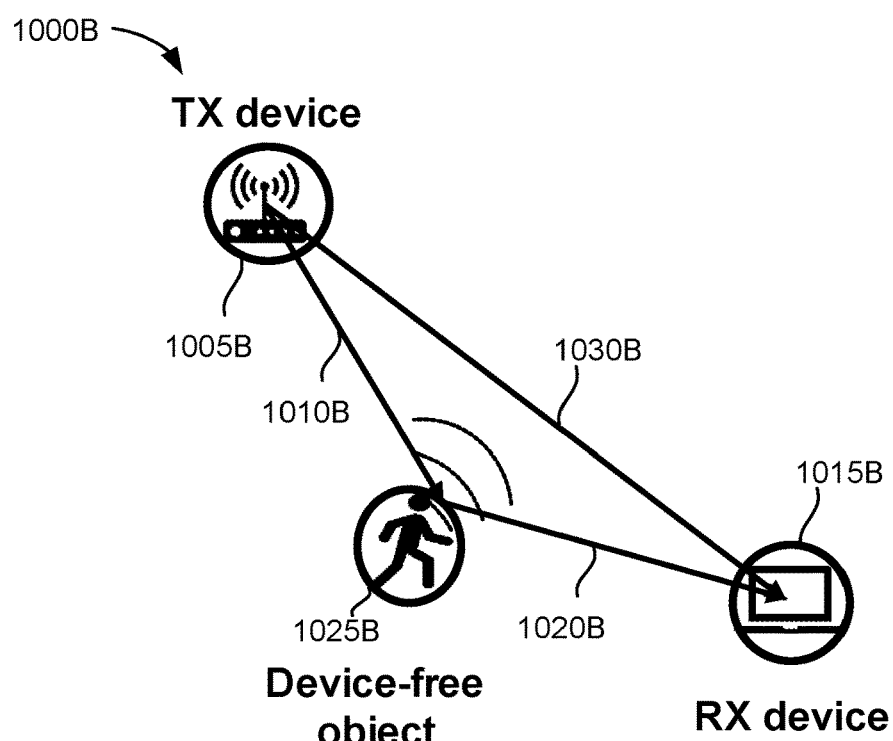

FIGS. 10A-10B illustrate RF signal-based object detection scenarios 1000A-1000B in accordance with aspects of the disclosure. In FIG. 10A, TX/RX device 1005A is configured to both transmit RF sensing signals 1010A for object detection and to receive and measure a reflection of those RF sensing signals 1015A which bounce off of a device-free target object 1020A. In FIG. 10B, TX device 1005B is configured to transmit RF sensing signals 1010B for object detection, and a separate RX device 1015B is configured to receive and measure a reflection of those RF sensing signals 1020B which bounce off of a device-free target object 1025B. TX device 1005B is further configured to transmit RF signals 1030B for communication to RX device 1015B. In some designs, the RF signals 1010B and 1030B may be the same (e.g., signals designed for both RF sensing for object detection as well as for communication, e.g., over different lobes or sidelobes of the same transmit beam from TX device 1005B).

Referring to FIGS. 10A-10B, in an example, the TX/RX device 1000A and/or the TX device 1000B may correspond to a UE or a base station (e.g., gNB). In an example where the TX/RX device 1000A and/or the TX device 1000B corresponds to a gNB, transmission power for communications typically has a fixed max power (with an instantaneous power based on pathloss) and the same fixed maximum power may be used for RF sensing signals as well. In an example where the TX/RX device 1000A and/or the TX device 1000B corresponds to a UE, the same power control scheme is typically utilized to control both RF signals for communication as well as RF signals for sensing (or object detection).

Aspects of the disclosure are directed in part to implementing different power control schemes in association with uplink (or UE-originated) RF signals for communication and uplink (or UE-originated) RF signals for at least object detection. In some designs, the RF signals for at least object detection may comprise RF signals (e.g., RF sensing signals) that are only utilized for object detection, or alternative RF signals being utilized for both object detection (e.g., sensing) and communication (e.g., uplink communication to one or more base stations, sidelink communication to one or more other UEs, etc.). In some aspects, utilizing different power control schemes in association with RF signals for communication and RF signals for at least object detection may provide various technical advantages, including a wider target object detection range (e.g., to detect more objects), a tailored target object detection range (e.g., to reduce interference/overhead), more accurate object detection, and so on.

Figure 11:
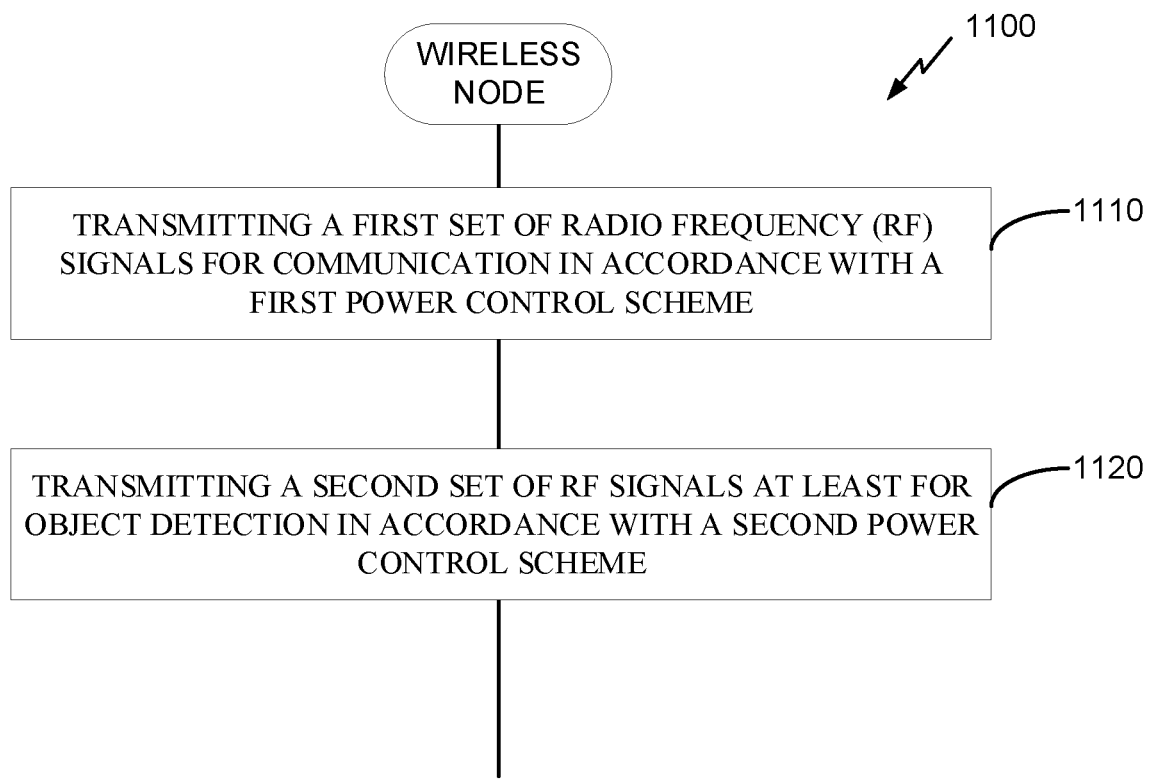
FIG. 11 illustrates an exemplary process of wireless communication, according to aspects of the disclosure.

FIG. 11 illustrates an exemplary process 1100 of wireless communication, according to aspects of the disclosure. In an aspect, the process 1100 may be performed by a wireless node, such as any of the UEs described above (e.g., UE 104, 300, etc.) or any of the BSs described above (e.g., BS 102, 300, etc.).

At 1110, the wireless node (e.g., wireless communications device 330, transmitter antenna array 334, etc.) transmits a first set of RF signals for communication in accordance with a first power control scheme. In an aspect, the first set of RF signals may more specifically comprise RF signals that are configured only for communication (e.g., including traffic data targeted to another communications device) rather than object detection (or sensing). In an example, the first power control scheme may be based in part upon a pathloss parameter between the UE and target device(s), such as base station(s) (e.g., for uplink communications) or other UE(s) (e.g., for sidelink communications).

At 1120, the wireless node (e.g., wireless communications device 330, transmitter antenna array 334, etc.) transmits a second set of RF signals at least for object detection in accordance with a second power control scheme. In some designs, the second set of RF signals may comprise RF signals configured for object detection (or sensing) only, without traffic data that is targeted to another communications device. In other designs, the second set of RF signals may comprise RF signals configured for both communication (e.g., including traffic data targeted to another communications device) as well as for object detection (or sensing).

Referring to FIG. 11, in some designs, the second power control scheme is based on a pathloss between the UE and a serving cell. In this case, the first and second power control schemes may be somewhat similar. In some designs, the second power control scheme may be based on serving cell pathloss in scenarios where the target object(s) are in close proximity to the UE or serving cell because the object-deflection path is similar to the direct UE to serving cell path. By contrast, if the target object(s) are far away from the serving cell and UE, the object-deflection path (and hence, the pathloss) is much greater.

Referring to FIG. 11, in some designs, the second power control scheme may comprise setting a transmission power for the set of second RF signals to a fixed value, such as a maximum transmission value permitted for the UE. In an example, setting the transmission power for the set of second RF signals to a maximum transmission value permitted for the wireless node may function to maximum a target detection area. However, this approach also increases spectral interference.

Referring to FIG. 11, in some designs, the second power control scheme may comprise a transmission power ramping scheme. For example, the transmission power ramping scheme may start transmission of one or more RF signals at a minimum transmission power level ($P_{min,sensing}$) and then increase transmission power in accordance with a given step size ($P_{step,sensing}$) until one or more target objects are detected (e.g., either at the wireless node itself in a TX/RX device scenario 1000A as in FIG. 10A, or via feedback from an RX device in accordance with scenario 1000B as in FIG. 10B) or a maximum transmission power level ($P_{max,sensing}$) is reached. In an example, $P_{max,sensing}$ may be set to a maximum transmission value permitted for the UE. In another example, $P_{max,sensing}$ may be set dynamically (e.g., based on serving cell pathloss, etc.).

Referring to FIG. 11, in some designs, the wireless node may dynamically select the second power control scheme from among a plurality of power control schemes based on at least one target object measurement objective. For example, the at least one target object measurement objective may comprise detecting target objects across a widest target detection area (e.g., select second power control scheme so as to use max wireless node transmission power), detecting one or more target objects proximate to the UE or a serving cell of the UE (e.g., select second power control scheme based in part upon pathloss to serving cell, although the precise algorithm need not be the same as the first power control scheme even if the first power control scheme is also based on serving cell pathloss), or detecting at least one target object using a lowest amount of transmission power (e.g., select second power control scheme to use power ramping scheme so power ramping starts when the object is detected rather than scaling higher, etc.), or any combination thereof.

In yet other designs, the second power control scheme may be based upon various other factors, including but not limited to a desired sensing granularity (e.g., if the environment sensing device is only sensing within a short range (e.g., 1 meter or less), the sensing device may configure the effective transmit power for the sensing waveform such that it only propagates over the given range).

Figure 12:
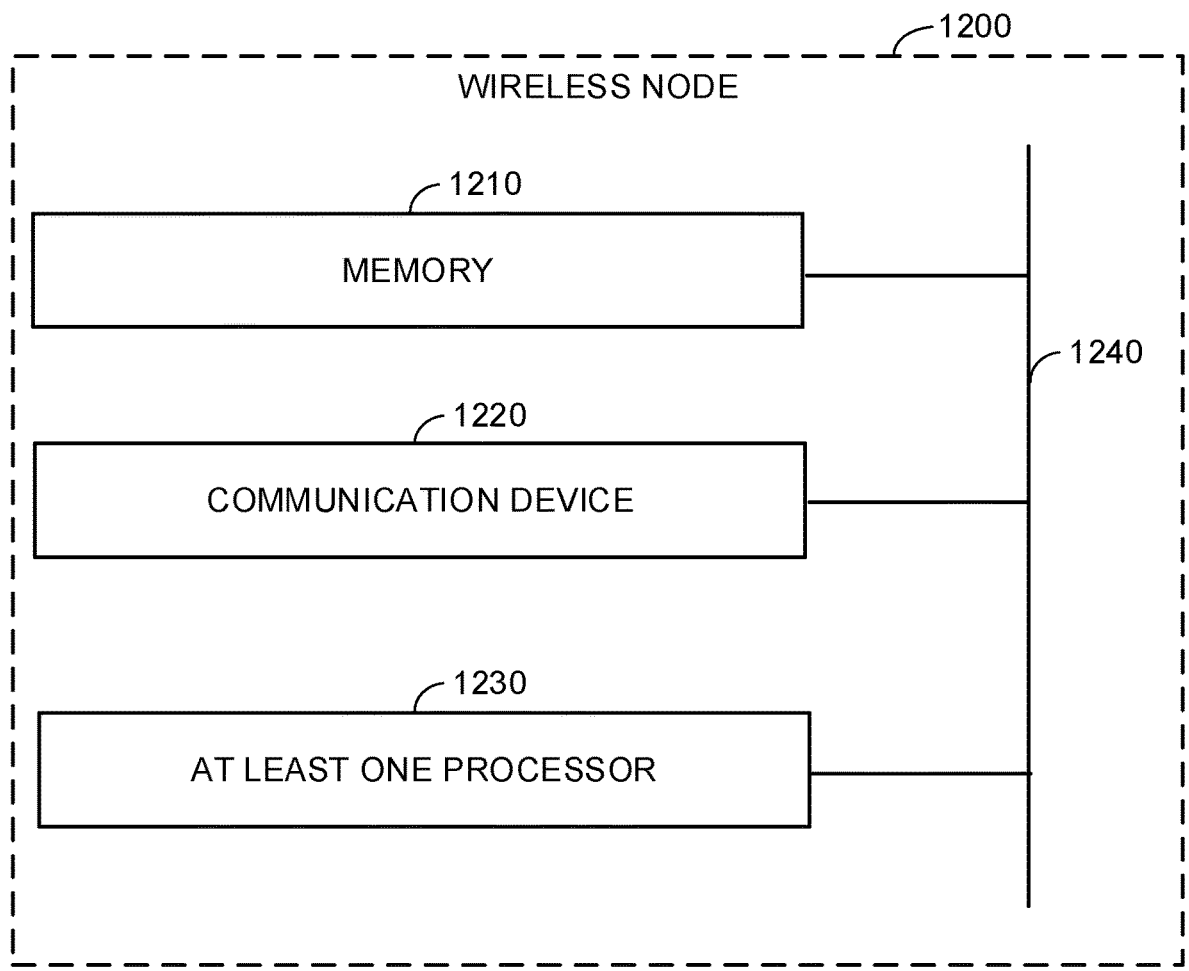
FIGS. 12-13 are simplified block diagrams of several sample aspects of a UE configured to support environment sensing operations as taught herein.

FIG. 12 illustrates an exemplary wireless node 1200 (e.g., UE or BS). The wireless node 1200 may include a memory 1210, a communication device 1220, and at least one processor 1230. The memory 1210, the communication device 1220, and the at least one processor 1230 may be communicatively coupled to each other over a data bus 1240. In an aspect, the memory 1210 may correspond to storage device(s) 325 and/or working memory 335, the communication device 1220 may correspond to wireless communication device 330 and/or sensing component 333, and the at least one processor 1230 may correspond to processing system 310 and/or sensing component 333.

In an aspect, the wireless node 1200 may be configured to perform environment sensing. In that case, the memory and the at least one processor 1230 and/or the communication device 1220 may be configured to configure one or more parameters for an environment sensing RF signal based on one or more factors, the environment sensing RF signal comprising an RF signal configured to transmit information on OFDM symbols. The memory and the at least one processor 1230 and/or the communication device 1220 may be further configured to cause the communication device 1220 to transmit the environment sensing RF signal in accordance with the one or more parameters.

In an aspect, the one or more transmission parameters may comprise a power control for the environment sensing RF signal, a bandwidth configuration for the environment sensing RF signal, a time duration configuration for the environment sensing RF signal, an antenna configuration for the environment sensing RF signal, or any combination thereof.

In an aspect, the one or more transmission parameters may comprise at least the power control for the environment sensing RF signal and the one or more factors may comprise: a sensing granularity to be provided by the environment sensing RF signal, an amount of interference permitted for the environment sensing RF signal, a type of application for which the environment sensing RF signal is being transmitted, a transmission power permitted to the electronic device, or any combination thereof.

In an aspect, the environment sensing RF signal may comprise an RF signal configured in accordance with a 5G NR wireless communications standard.

In an aspect, the environment sensing RF signal may comprise an RF signal configured in accordance with an IEEE wireless communications standard, such as 802.11ad.

In an aspect, the environment sensing RF signal may be in a 60 GHz frequency band, a mmW frequency band, or a THz frequency band.

Figure 13:
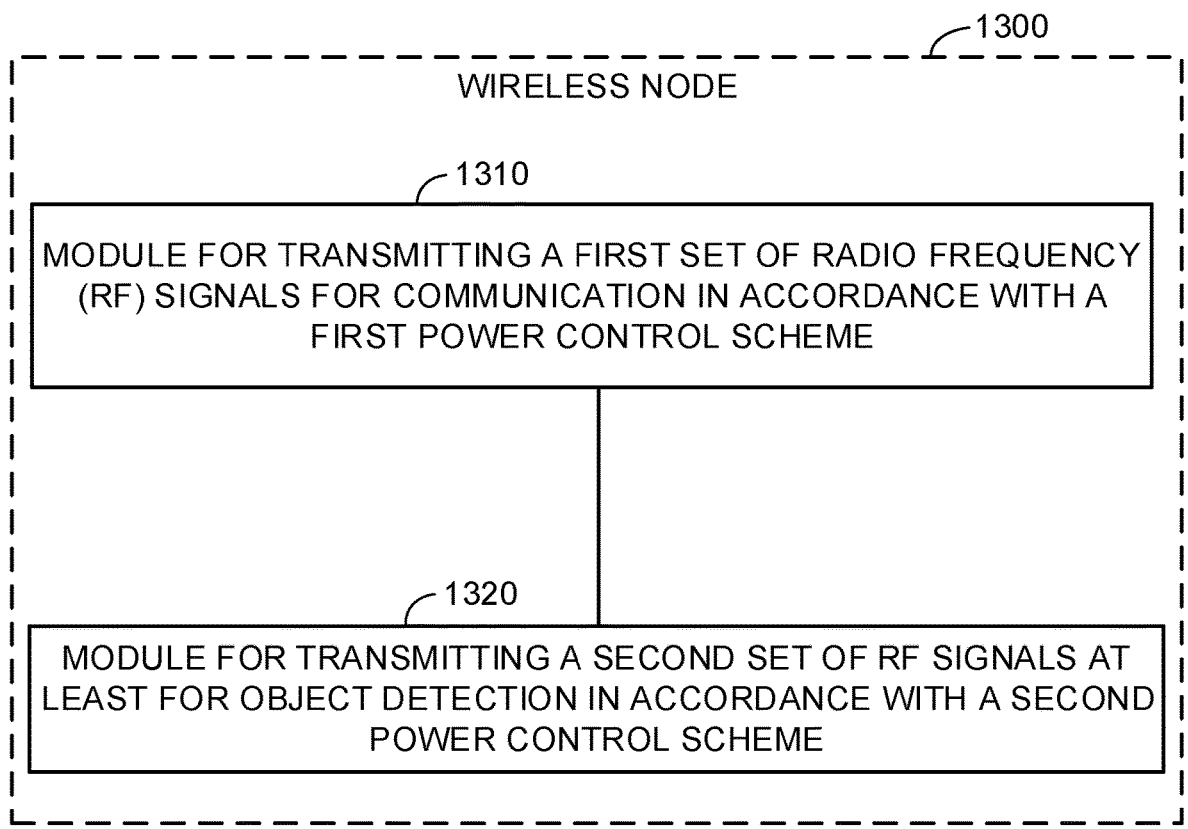

FIG. 13 illustrates an example wireless node 1300 (e.g., UE or BS) represented as a series of interrelated functional modules. The wireless node 1300 may include a module for transmitting 1310 and a module for transmitting 1320. In an aspect, the modules for transmitting 1320 may correspond to sensing component 333, wireless communication device 330, processing system 310, and/or working memory 335.

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a wireless node, comprising: transmitting a first set of radio frequency (RF) signals for communication in accordance with a first power control scheme; and transmitting a second set of RF signals at least for object detection in accordance with a second power control scheme.

Clause 2. The method of clause 1, wherein the second set of RF signals is configured for both communication and object detection.

Clause 3. The method of any of clauses 1 to 2, wherein the second power control scheme is based on a pathloss between a user equipment (UE) and a serving cell.

Clause 4. The method of any of clauses 1 to 3, wherein the second power control scheme sets a transmission power to a fixed value.

Clause 5. The method of any of clauses 1 to 4, wherein the second power control scheme comprises a transmission power ramping scheme.

Clause 6. The method of clause 5, wherein the transmission power ramping scheme starts transmission of one or more RF signals at a minimum transmission power level and increases transmission power in accordance with a given step size until one or more target objects are detected or a maximum transmission power level is reached.

Clause 7. The method of any of clauses 1 to 6, further comprising: selecting the second power control scheme from among a plurality of power control schemes based on at least one target object measurement objective.

Clause 8. The method of clause 7, wherein the at least one target object measurement objective comprises: detecting target objects across a widest target detection area, or detecting one or more target objects proximate to a user equipment (UE) or a serving cell of the UE, or detecting at least one target object using a lowest amount of transmission power, or any combination thereof.

Clause 9. An apparatus comprising a memory and at least one processor communicatively coupled to the memory, the memory and the at least one processor configured to perform a method according to any of clauses 1 to 8.

Clause 10. An apparatus comprising means for performing a method according to any of clauses 1 to 8.

Clause 11. A non-transitory computer-readable medium storing computer-executable instructions, the computer-executable comprising at least one instruction for causing a computer or processor to perform a method according to any of clauses 1 to 8.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

The invention claimed is:

1. A method of operating a wireless node, comprising:
   transmitting a first set of radio frequency (RF) signals for communication in accordance with a first power control scheme; and
   transmitting a second set of RF signals at least for object detection of at least one target object that is separate from the wireless node and a user of the wireless node in accordance with a second power control scheme,
   wherein the wireless node sets a transmission power associated with the second power control scheme to at least one value that is greater than or equal to a transmission power associated with the first set of RF signals.

2. The method of claim 1, wherein the second set of RF signals is configured for both communication and object detection.

3. The method of claim 1, wherein the second power control scheme is based on a pathloss between a user equipment (UE) and a serving cell.

4. The method of claim 1, wherein the second power control scheme sets the transmission power to a fixed value that is greater than or equal to the transmission power associated with the first set of RF signals.

5. The method of claim 1, wherein the second power control scheme comprises a transmission power ramping scheme.

6. The method of claim 5, wherein the transmission power ramping scheme starts transmission of one or more RF signals at a minimum transmission power level and increases transmission power in accordance with a given step size until one or more target objects are detected or a maximum transmission power level is reached.

7. The method of claim 1, further comprising:
   selecting the second power control scheme from among a plurality of power control schemes based on at least one target object measurement objective.

8. The method of claim 7, wherein the at least one target object measurement objective comprises:
   detecting target objects across a widest target detection area, or
   detecting one or more target objects proximate to a user equipment (UE) or a serving cell of the UE, or
   detecting at least one target object using a lowest amount of transmission power, or
   any combination thereof.

9. A wireless node, comprising:
   a memory;
   a communication interface; and
   at least one processor communicatively coupled to the memory and the communication interface, the at least one processor configured to:
   cause the communication interface to transmit a first set of radio frequency (RF) signals for communication in accordance with a first power control scheme; and
   cause the communication interface to transmit a second set of RF signals at least for object detection of at least one target object that is separate from the wireless node and a user of the wireless node in accordance with a second power control scheme,
   wherein the wireless node sets a transmission power associated with the second power control scheme to at least one value that is greater than or equal to a transmission power associated with the first set of RF signals.

10. The wireless node of claim 9, wherein the second set of RF signals is configured for both communication and object detection.

11. The wireless node of claim 9, wherein the second power control scheme is based on a pathloss between a user equipment (UE) and a serving cell.

12. The wireless node of claim 9, wherein the second power control scheme sets the transmission power to a fixed value that is greater than or equal to the transmission power associated with the first set of RF signals.

13. The wireless node of claim 9, wherein the second power control scheme comprises a transmission power ramping scheme.

14. The wireless node of claim 13, wherein the transmission power ramping scheme starts transmission of one or more RF signals at a minimum transmission power level and increases transmission power in accordance with a given step size until one or more target objects are detected or a maximum transmission power level is reached.

15. The wireless node of claim 9, wherein the at least one processor is further configured to:
select the second power control scheme from among a plurality of power control schemes based on at least one target object measurement objective.

16. The wireless node of claim 15, wherein the at least one target object measurement objective comprises:
detect target objects across a widest target detection area, or
detect one or more target objects proximate to a user equipment (UE) or a serving cell of the UE, or
detecting at least one target object using a lowest amount of transmission power, or any combination thereof.

17. A wireless node, comprising:
means for transmitting a first set of radio frequency (RF) signals for communication in accordance with a first power control scheme; and
means for transmitting a second set of RF signals at least for object detection of at least one target object that is separate from the wireless node and a user of the wireless node in accordance with a second power control scheme,
wherein the wireless node sets a transmission power associated with the second power control scheme to at least one value that is greater than or equal to a transmission power associated with the first set of RF signals.

18. The wireless node of claim 17, wherein the second set of RF signals is configured for both communication and object detection.

19. The wireless node of claim 17, wherein the second power control scheme is based on a pathloss between a user equipment (UE) and a serving cell.

20. The wireless node of claim 17, wherein the second power control scheme sets the transmission power to a fixed value that is greater than or equal to the transmission power associated with the first set of RF signals.

21. The wireless node of claim 17, wherein the second power control scheme comprises a transmission power ramping scheme.

22. The wireless node of claim 21, wherein the transmission power ramping scheme starts transmission of one or more RF signals at a minimum transmission power level and increases transmission power in accordance with a given step size until one or more target objects are detected or a maximum transmission power level is reached.

23. The wireless node of claim 17, further comprising:
means for selecting the second power control scheme from among a plurality of power control schemes based on at least one target object measurement objective.

24. The wireless node of claim 23, wherein the at least one target object measurement objective comprises:
means for detecting target objects across a widest target detection area, or
means for detecting one or more target objects proximate to a user equipment (UE) or a serving cell of the UE, or
detecting at least one target object using a lowest amount of transmission power, or
any combination thereof.

25. A non-transitory computer-readable medium storing computer-executable instructions that, when executed by a wireless node, cause the wireless node to:
transmit a first set of radio frequency (RF) signals for communication in accordance with a first power control scheme; and
transmit a second set of RF signals at least for object detection of at least one target object that is separate from the wireless node and a user of the wireless node in accordance with a second power control scheme,
wherein the wireless node sets a transmission power associated with the second power control scheme to at least one value that is greater than or equal to a transmission power associated with the first set of RF signals.

26. The non-transitory computer-readable medium of claim 25, wherein the second set of RF signals is configured for both communication and object detection.

27. The non-transitory computer-readable medium of claim 25, wherein the second power control scheme is based on a pathloss between a user equipment (UE) and a serving cell.

28. The non-transitory computer-readable medium of claim 25, wherein the second power control scheme sets the transmission power to a fixed value that is greater than or equal to the transmission power associated with the first set of RF signals.

29. The non-transitory computer-readable medium of claim 25, wherein the second power control scheme comprises a transmission power ramping scheme.

30. The non-transitory computer-readable medium of claim 29, wherein the transmission power ramping scheme starts transmission of one or more RF signals at a minimum transmission power level and increases transmission power in accordance with a given step size until one or more target objects are detected or a maximum transmission power level is reached.

* * * * *